Figure 1:
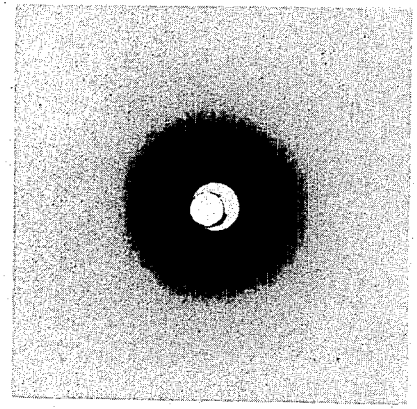

United States Patent
Le Grand

[15] 3,679,774
[45] July 25, 1972

[54] CRYSTALLIZED ORGANOPOLYSILOXANE-POLYCARBONATE BLOCK POLYMERS AND METHOD FOR MAKING THEM

[72] Inventor: Donald G. Le Grand, Burnt Hills, N.Y.
[73] Assignee: General Electric Company
[22] Filed: March 2, 1970
[21] Appl. No.: 15,472

[52] U.S. Cl. ..................260/824 R, 55/522, 252/63.2, 252/63.7, 260/47 XA
[51] Int. Cl. ..................................................C08g 47/10
[58] Field of Search..................260/824, 47 XA, 32.8 SB

[56] References Cited

UNITED STATES PATENTS

| | | | |
|---|---|---|---|
| 3,189,662 | 6/1965 | Vaughn | 260/824 |
| 3,306,873 | 2/1967 | Von Falkai et al. | 260/47 XA |
| 3,379,790 | 4/1968 | Krauss et al. | 260/824 |

OTHER PUBLICATIONS

Christopher et al., Polycarbonates, Reinhold Publ. Corp., N.Y. 1962

*Primary Examiner*—Samuel H. Blech
*Attorney*—Richard R. Brainard, Joseph T. Cohen, Paul A. Frank, Charles T. Watts, William A. Teoli, Frank L. Neuhauser, Oscar B. Waddell and Joseph B. Forman

[57] ABSTRACT

Random alternating organopolysiloxane-polycarbonate block polymers can be crystallized by contacting the block polymer with a methylalkylketone in the vapor or liquid state. The resulting crystallized organopolysiloxane-polycarbonate block polymers exhibit improved physical characteristics, such as tensile strength (psi) and improved resistance to distortion at elevated temperature. The crystallized organopolysiloxane-polycarbonate block polymers can be employed as dielectrics and as permselective membranes for separating gases and vapors.

6 Claims, 2 Drawing Figures

PATENTED JUL 25 1972  3,679,774

Inventor :
Donald G. Le Grand, by William A. Teoli
His Attorney.

CRYSTALLIZED ORGANOPOLYSILOXANE-POLYCARBONATE BLOCK POLYMERS AND METHOD FOR MAKING THEM

The present invention relates to a method for inducing crystallization in organopolysiloxane-polycarbonate block polymers and to the products produced thereby.

Organopolysiloxane-polycarbonate block polymers and methods for making them are shown by Vaughn U.S. Pats. Nos. 3,189,662 and 3,419,634, assigned to the same assignee as the present invention. As taught in these patents, the organopolysiloxane-polycarbonate block polymers have unique properties which are not possessed by either organopolysiloxanes or polycarbonates. Among the uses of these materials are surface coverings for appliances, insulation, coatings for rods and wires, binding material for parts and laminates, adhesive formulations, etc. These materials also can be employed to make room temperature vulcanizing organopolysiloxane-polycarbonate compositions as taught by Vaughn U.S. Pat. No. 3,419,635 also assigned to the same assignee as the present invention. Recently, the organopolysiloxane-polycarbonate block polymer films have been found to be valuable permselective membranes for liquid and gas separation such as providing for oxygen separation from an oxygen containing gas mixture. In addition to exhibiting a high oxygen permeability, the copolymers are thermoplastic and can be advantageously heat sealed into sheets or containers to a desired size or shape. In medical applications, due to the thermoplastic properties of the copolymers, undesirable distortion of the preform can result at temperatures around 100° C required for sterilization. As a result, the employment of the block polymers as a medical tool often has been restricted to applications which did not require sterilization.

The present invention is based on the discovery that shaped organopolysiloxane-polycarbonate block polymers having improved heat distortion and tensile (psi) can be obtained by contacting the preformed block polymer with certain methylalkylketones in the vaporous or liquid state. It has been found that as a result of such treatment, crystallization is induced into the block polymer which is dramatically illustrated by comparing FIG. 1, showing the X-ray diffraction pattern of the untreated block polymer, and FIG. 2, the treated block polymer.

There is provided by the present invention, a process for inducing crystallization into an organopolysiloxane-polycarbonate block polymer which comprises contacting the block polymer with a methylalkylketone at a temperature in the range of between 0° to 250° C.

Some of the organopolysiloxane-polycarbonate block polymers which can be utilized in the invention are illustrated by the following formula, (1)

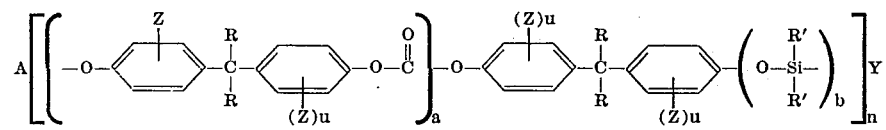

where $n$ is at least 1, and preferably $n$ is an integer equal to from 1 to about 1,000, inclusive, $a$ is equal to from 1 to about 200, inclusive, and preferably $b$ has an average value from about 15 to about 90, inclusive, while the ratio of $a$ to $b$ can vary from 0.05 to about 3, inclusive, and when $b$ has an average value of from about 15 to about 90, inclusive, the ratio of $a$ to $b$ is preferably from about 0.067 to about 0.45, inclusive, $u$ is an integer equal to from 1 to 4, inclusive, Y is

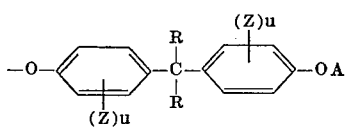

A is a member selected from the class of hydrogen and

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals, and cyanoalkyl radicals, and Z is a member selected from the class of hydrogen, lower alkyl radicals and halogen radicals.

As taught by Vaughn, U.S. Pat. No. 3,189,662, organopolysiloxane-polycarbonate block polymers can be made by initially forming aryloxy chainstopped polydiorganosiloxane by effecting contact between a halogen chainstop polydiorganosiloxane having up to about 200 chemically combined polydiorganosiloxy units and terminal halogen radicals and dihydric phenol, such as bisphenol in the presence of an acid acceptor, for example pyridine. The resulting mixture containing excess dihydric phenol is then phosgenated to produce a polydiorganosiloxane-polycarbonate block polymer. Depending upon the block size of the halogen chainstopped polydiorganosiloxane and the relative weight percent of siloxane and dihydric phenol utilized in the phosgenation mixture, a wide variety of block polymers can be made. The organopolysiloxane-polycarbonate block polymers of the present invention can contain from 1 to 95 percent by weight of organopolysiloxane blocks, and from 5 to 99 percent by weight of polycarbonate blocks. Preferably, the polycarbonate blocks should have at least about 15 chemically combined polycarbonate units.

In addition to the above described organopolysiloxane-polycarbonate siloxane-polycarbonate block polymers made by the phosgenation of polydiorganosiloxane having terminal bisphenol units joined to the polydiorganosiloxane by aryloxy linkages, organopolysiloxane-polycarbonate block polymers also can be utilized having silicon-carbon linkages joining the polydiorganosiloxane block to the polycarbonate block as taught in U.S. Pat. No. 3,419,634 (Vaughn). These silicon-carbon bonded block polymers have improved hydrolytic stability as compared to the block copolymers having aryloxy silicon linkages. Phosgenation of a mixture of the dihydric phenol and polydiorganosiloxane having terminal hydroxyorganodiorganosiloxy units, such as dimethyl hydroxybutylsiloxy units, can provide for such hydrolytically stable block polymers.

In addition to the aforedescribed method for inducing crystallization into organopolysiloxane-polycarbonate block polymers, there also is provided by the present invention crystallized organopolysiloxane-polycarbonate block polymers comprising (A) from 1 to 95 percent by weight of polydiorganodisiloxane composed from about 2 to 200 chemically combined diorgansiloxy units consisting essentially of dialkylsiloxy units which are joined to each other by silicon-oxygen-silicon linkages, wherein each of the silicon atoms has two organo radicals attached by a carbon-silicon bond, and (B) from 99 to 5 percent by weight of an intercondensation product of a dihydric phenol and a carbonyl halide where said polydiorganosiloxane and said intercondensation product is joined by a linkage selected from aryloxy-silicon and carbon-silicon.

The crystallization in the organopolysiloxane and polycarbonate block polymer can be determined by X-ray diffraction or by use of a Differential Scanning Calorimeter. Experience has shown that the crystallized organopolysiloxane and polycarbonte block polymers have melting points between about 180° C to about 275° C as determined by a Differential Scanning Calorimeter. A technique which can be employed to measure the melting temperature of the crystallized block polymer is shown by E.S. Watson, M.J. O'Neill, J. Justin and N. Brenner, *A Differential Scanning Calorimeter for Quantitative Differential Thermal Analysis*, Anal. Chem. 36, p. 1,233 (1964).

The methylalkylketones which can be employed in the practice of the invention are, for example, methylethylketone, methylpropylketone and methylisobutylketone and ketones having at least one methyl radical and an alkyl radical containing from two to eight carbon atoms.

The crystallized organopolysiloxane-polycarbonate block polymers of the present invention can be employed as perm-selective membranes and as dielectrics when utilized in the form of films. In addition, prior to crystallization, the organopolysiloxane-polycarbonate block polymers can be molded into a preform, such as a gasket, extruded in the form of fibers, etc., and then treated by the method of the invention to improve the physical properties of such preform.

In the practice of the invention, the organopolysiloxane-polycarbonate block polymer, hereinafter referred to as the block polymer, is contacted with the methylalkylketone, hereinafter can be referred to as the dialkylketone, to effect the crystallization of the block polymer.

Contact between the dialkylketone and the block polymer can be effected when utilizing the dialkylketone in the form of a liquid or vapor. Preferably, the block polymer is utilized in the form of a film which has been cast, molded or extruded. However, block polymer shaped to any desired configuration can be benefited by the method of the invention. Contact temperatures which can be employed to induce crystallization in the block polymer can vary widely depending upon time of contact, weight percent of polycarbonate in the block polymer, degree of crystallization desired in the block polymer, polycarbonate block size, etc. A temperature in the range of between about 0° to 250° C can be employed, while it is preferred to operate at about room temperature since, under these conditions, liquid contact with the dialkylketone, such as immersion, can be effected.

Crystallization can be induced instantaneously upon contact between the dialkylketone and the block polymer. Desirable results can be achieved in 10 minutes, more or less, if the block polymer is immersed in the dialkylketone at room temperature. Extended contact, such as an hour or more, can induce crystallization beyond desirable limits and render the block polymer less useful in particular applications. Generally if the block size of the polycarbonate is at least about 15 chemically combined polycarbonate units, which can be determined by method of NMR, at least a limited degree of crystallization will occur upon immediate contact between the block polymer and the dialkylketone under the conditions previously described. Crystallization will progress throughout the block polymer until a steady state is achieved depending upon contact time.

The degree of crystallization in the block polymer can be determined by use of X-ray diffraction techniques. Since the application to which the material is to be applied may vary widely, the degree of crystallization required also can vary widely. Upon examination of the physical properties of the final product after treatment, those skilled in the art can readily determine the time of contact with the dialkylketone required under the parameters, such as temperature, and the composition of the block polymer employed.

In order that those skilled in the art will be better able to practice the invention, the following examples are given by way of illustration and not by way of limitation. All parts are by weight.

EXAMPLE 1

Several polydimethylsiloxane-polycarbonate block polymers were prepared in accordance with the method taught by Vaughn U.S. Pat. No. 3,189,662. Table I shows the density, weight percent of polydimethylsiloxane (Si) in the block polymer and the average number of chemically-combined dimethylsiloxy units in the polydimethylsiloxane block (siloxane block size) of block polymers A, B, C and D. The composition of the respective block polymers were based on the method of preparation and nuclear magnetic resonance.

TABLE I

|   | Density | % Si | Siloxane Block Size |
|---|---------|------|---------------------|
| A | 1.2     | 25   | 20                  |
| B | 1.2     | 15   | 11                  |
| C | 1.21    | 13   | 40                  |
| D | 1.05    | 65   | 100                 |

Solutions of each of the above block polymers were made by dissolving 20 parts of the respective block polymer in about 100 parts of methylenechloride at room temperature. Films were cast from the solutions onto a glass plate which were then vacuum dried for 24 hours. Test samples were then cut from films A, B, C and D respectively. The test samples were then tested on an Instron test meter at 150° C to determine their respective physical properties. It was not possible to test sample D, since the block polymer flowed at about 100° C.

The respective test samples where then immersed in methylethylketone for 10 minutes at about 25° C. The respective samples were then vacuum dried. Another test sample from film C also was immersed in methylethylketone for 1 hour at room temperature and vacuum dried. The samples were then tested on the Instron tester at 150° C following the same procedure previously described. The following table shows the average results obtained with two samples of each of respective block polymers before and after 10-minute immersion in methylethylketone, where UTS is ultimate tensile strength (psi) and UE is ultimate elongation on the Instron Tester at 150° C.

TABLE II

|   | Methylethylketone Treatment | | | |
|---|------|------|------|------|
|   | No | | Yes | |
|   | UTS | UE | UTS | UE |
| A | 295 | 1040 | 1220 | 440 |
| B | 1180 | 500 | 4360 | 410 |
| C | 940 | 375 | 1920 | 200 |
| D | Could Not Be Tested | | 290 | 410 |

EXAMPLE 2

Figure 2:
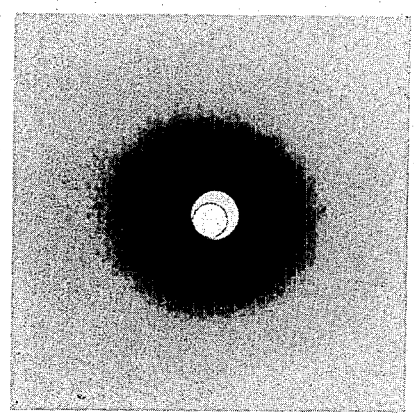

The procedure of Example 1 was repeated except that in place of methylethylketone there was employed methylpropylketone and methylisobutylketone. The test samples were respectively immersed in the aforementioned ketones for 10 minutes at about 25° C. The samples were then vacuum dried. The samples were found to have the characteristic X-ray diffraction pattern as shown in FIG. 2 as compared to the untreated samples. This showed that crystallization had been induced in the samples.

Although the above samples are limited to only some of the very many variables within the scope of the present invention, it should be understood that the present invention is directed to the treatment of a much broader variety of organopolysiloxane and polycarbonate block polymers and to crystallized block polymers produced thereby.

I claim:

1. Organopolysiloxane-polycarbonate block polymer having sufficient crystallized organopolysiloxane-polycarbonate block polymer of the formula,

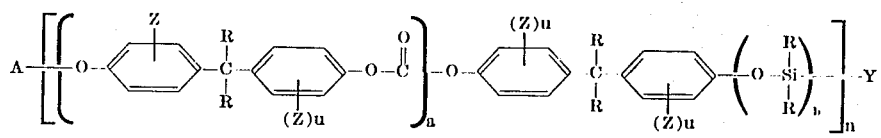

to provide films capable of being tested for ultimate tensile strength and ultimate elongation at 150° C on an Instron Tester, where $n$ is at least 1, $a$ is equal to from about 15 to about 200, inclusive, $b$ is equal to from about 5 to about 200, inclusive, while the ratio of $a$ to $b$ can vary from 0.05 to about 3, inclusive, $u$ is an integer equal to from 1 to 4, inclusive, Y is

A is a member selected from the class of hydrogen and $$-\overset{O}{\underset{\|}{C}}-OR$$

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals, and cyanoalkyl radicals, and Z is a member selected from the class of hydrogen, lower alkyl radicals and halogen radicals.

2. Organopolysiloxane-polycarbonate block polymers in accordance with claim 1, having from 1 to 95 percent by weight of organopolysiloxane composed of blocks consisting essentially of chemically-combined diorganosiloxy units and from 5 to 99 percent by weight of blocks of polycarbonate.

3. A block polymer in accordance with claim 2, consisting essentially of chemically combined blocks of polydimethylsiloxane and the reaction product of carbonyl chloride and 2,2-bis(4-hydroxyphenyl)propane.

4. A method which comprises effecting contact at a temperature in the range of from 0° to 250° C. of an organopolysiloxane-polycarbonate block polymer and a methylalkylketone selected from ketones having at least one methyl radical and an alkyl radical containing from two to eight carbon atoms, where said organopolysiloxane-polycarbonate block copolymer has the formula,

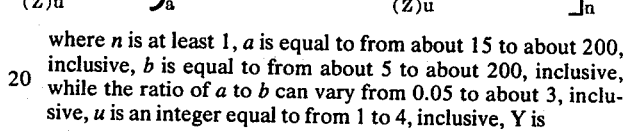

where $n$ is at least 1, $a$ is equal to from about 15 to about 200, inclusive, $b$ is equal to from about 5 to about 200, inclusive, while the ratio of $a$ to $b$ can vary from 0.05 to about 3, inclusive, $u$ is an integer equal to from 1 to 4, inclusive, Y is

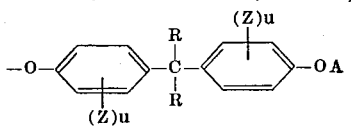

A is a member selected from the class of hydrogen and $$-\overset{O}{\underset{\|}{C}}-OR$$

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals, and cyanoalkyl radicals, and Z is a member selected from the class of hydrogen, lower alkyl radicals and halogen radicals.

5. The method of claim 4, where the methylalkyl ketone is methylethylketone.

6. The method of claim 4, where the organopolysiloxane-polycarbonate block polymer is immersed in methylethylketone.

* * * * *